(12) United States Patent
Matthews et al.

(10) Patent No.: US 11,608,125 B2
(45) Date of Patent: *Mar. 21, 2023

(54) ACTIVE FRONT DEFLECTOR-FLAT PANEL

(71) Applicant: Magna Exteriors Inc., Concord (CA)

(72) Inventors: Martin R. Matthews, Troy, MI (US);
Braendon R. Lindberg, Metamora, MI (US); Yao Wang, Troy, MI (US)

(73) Assignee: MAGNA EXTERIORS, INC., Concord (CA)

( * ) Notice: Subject to any disclaimer, the term of this patent is extended or adjusted under 35 U.S.C. 154(b) by 95 days.

This patent is subject to a terminal disclaimer.

(21) Appl. No.: 17/206,618

(22) Filed: Mar. 19, 2021

(65) Prior Publication Data

US 2021/0206436 A1 Jul. 8, 2021

Related U.S. Application Data

(63) Continuation of application No. 16/982,564, filed as application No. PCT/US2019/025546 on Apr. 3, 2019, now Pat. No. 10,981,611.

(60) Provisional application No. 62/651,859, filed on Apr. 3, 2018.

(51) Int. Cl.
*B62D 35/00* (2006.01)
*B62D 35/02* (2006.01)

(52) U.S. Cl.
CPC .................. *B62D 35/005* (2013.01)

(58) Field of Classification Search
CPC .............................. B62D 35/005; B62D 35/02
See application file for complete search history.

(56) References Cited

U.S. PATENT DOCUMENTS

| 8,702,152 B1* | 4/2014 | Platto | B62D 37/02 296/180.1 |
| 8,887,845 B2* | 11/2014 | McDonald | B62D 35/005 296/180.5 |
| 9,527,535 B1 | 12/2016 | Cha et al. | |
| 2015/0084369 A1* | 3/2015 | Niemi | B62D 35/02 296/180.1 |

(Continued)

FOREIGN PATENT DOCUMENTS

| CN | 204150133 U | 2/2015 |
| CN | 104724191 A | 6/2015 |

(Continued)

OTHER PUBLICATIONS

Notification of Transmittal of the International Search Report and the Written Opinion of the International Searching Authority for International Application No. PCT/US2019/025546, dated Sep. 6, 2019.

(Continued)

*Primary Examiner* — Gregory A Blankenship
(74) *Attorney, Agent, or Firm* — Warn Partners, P.C.

(57) ABSTRACT

An active front deflector assembly for a vehicle capable of moving between an extended position and a retracted position or any position there between. The active front deflector assembly has a cross member for attaching to an underbody of a vehicle. The frame member also includes a plurality of slip joint connections for connecting to the underbody of the vehicle. The cross member is a fixed link of an actuator link assembly that has an actuator, drive link, floating link and a blade.

20 Claims, 6 Drawing Sheets

(56) References Cited

U.S. PATENT DOCUMENTS

| | | | | |
|---|---|---|---|---|
| 2017/0106922 A1* | 4/2017 | Povinelli | | B62D 35/005 |
| 2017/0120968 A1* | 5/2017 | Povinelli | | B62D 37/02 |
| 2017/0355403 A1* | 12/2017 | Grebel | | B62D 35/00 |
| 2020/0094889 A1* | 3/2020 | Shiga | | B62D 35/02 |
| 2020/0164934 A1* | 5/2020 | Shiga | | B62D 35/005 |
| 2021/0009210 A1* | 1/2021 | Matthews | | B62D 35/005 |
| 2021/0139088 A1* | 5/2021 | Tachi | | B62D 37/02 |
| 2022/0126930 A1* | 4/2022 | Grebel | | B62D 37/02 |
| 2022/0153356 A1* | 5/2022 | Salter | | B62D 37/02 |

FOREIGN PATENT DOCUMENTS

| | | |
|---|---|---|
| CN | 106458272 A | 2/2017 |
| CN | 106660595 A | 5/2017 |
| CN | 107487389 A | 12/2017 |
| DE | 102008024893 A1 | 11/2009 |
| JP | S58100874 U | 7/1983 |
| JP | S58191672 A | 11/1983 |
| JP | S6158175 U | 4/1986 |
| JP | S62156087 U | 10/1987 |
| JP | H06227441 A | 8/1994 |
| JP | H0986452 A | 3/1997 |
| JP | 2017052501 A | 3/2017 |
| JP | 2017226244 A | 12/2017 |
| WO | 2016102881 A1 | 6/2016 |
| WO | 2017199231 A1 | 11/2017 |

OTHER PUBLICATIONS

Chinese Office Action for Application No. 201980024494.8, dated Mar. 18, 2021.

Japanese Office Action for Application No. 2020-553608, dated Feb. 18, 2021.

* cited by examiner

ACTIVE FRONT DEFLECTOR-FLAT PANEL

CROSS-REFERENCE TO RELATED APPLICATIONS

This application claims the benefit of pending U.S. Utility patent application Ser. No. 16/982,564 filed on Sep. 9, 2020, which is a national phase application under 35 USC 371 of PCT International Patent Application No. PCT/US2019/025546, which claims the benefit of U.S. Provisional Application No. 62/651,859, filed Apr. 3, 2018. The disclosures of the above applications are incorporated herein by reference.

FIELD OF THE INVENTION

The present invention relates to a flat panel active front deflector to improve vehicle overall aerodynamics by reducing vehicle drag and improving fuel consumption.

BACKGROUND OF THE INVENTION

There is a considerable loss of aerodynamic efficiency in vehicles, in particular, due to the airflow underneath and around a vehicle. Conventional structures, such as fixed panels or fixed air deflectors/dams using flexible materials, are known and do not meet desired requirements. These fixed air deflector/dams are still a compromise as they cannot be made to the optimum height without compromising specifications and other vehicle capabilities. Further, these air dams even when flexible are still damaged during off-roading or when added ground clearance is needed. Accordingly, there is a desire for an active front deflector that provides an aerodynamic surface for improved aerodynamics when deployed, but is retractable out of the way under predetermined conditions to return the vehicle to its initial design intent. It is further an object of the invention to provide smooth underbody airflow, reduce ram air in front of tires, create vacuum on vehicle underside, minimize impact of air dam restriction and optimize effect with other aerodynamic systems.

SUMMARY OF THE INVENTION

An active front deflector assembly for a vehicle capable of moving between an extended position, a retracted position or any position there between. The active front deflector assembly has a cross member for attaching to an underbody of a vehicle. The frame member also includes a plurality of slip joint connections for connecting to the underbody of the vehicle. The cross member is a fixed link of an actuator link assembly that has an actuator, drive link, floating link and a blade.

Connected to the cross member is the actuator that is part of the actuator link assembly. The actuator has at least one flange extending from an actuator housing for connecting to the cross member. The actuator also includes a pass through drive connection through the actuator housing, where the pass through drive connection has two connection openings on opposite sides of the actuator housing. Each of the two connection openings has a female shaped surface.

The actuator link assembly also includes the drive link connected to the pass through drive connection of the actuator. The drive link is two pieces connected together with at a bridge for moving both of the two pieces of the drive link together. Each of the two pieces of the drive link include a drive connection end and driven connection end, where the drive connection end connects with a respective one of the two connection openings of the pass through drive connection. Each drive connection end has a male shaped surface for providing a mating connection with the female shaped surface of the respective one of the two connection openings. The floating link is rotatably connected to each driven end of the two pieces of the drive link with a pivot pin connection.

The actuator link assembly further includes the blade, which is also a follower link, connected between the floating link and the cross member. The blade is connected to the cross member with one or more pin pivots and the blade is pivotally connected to the floating link so that when the actuator is energized the blade pivots about the one or more pivot pins on the cross member.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
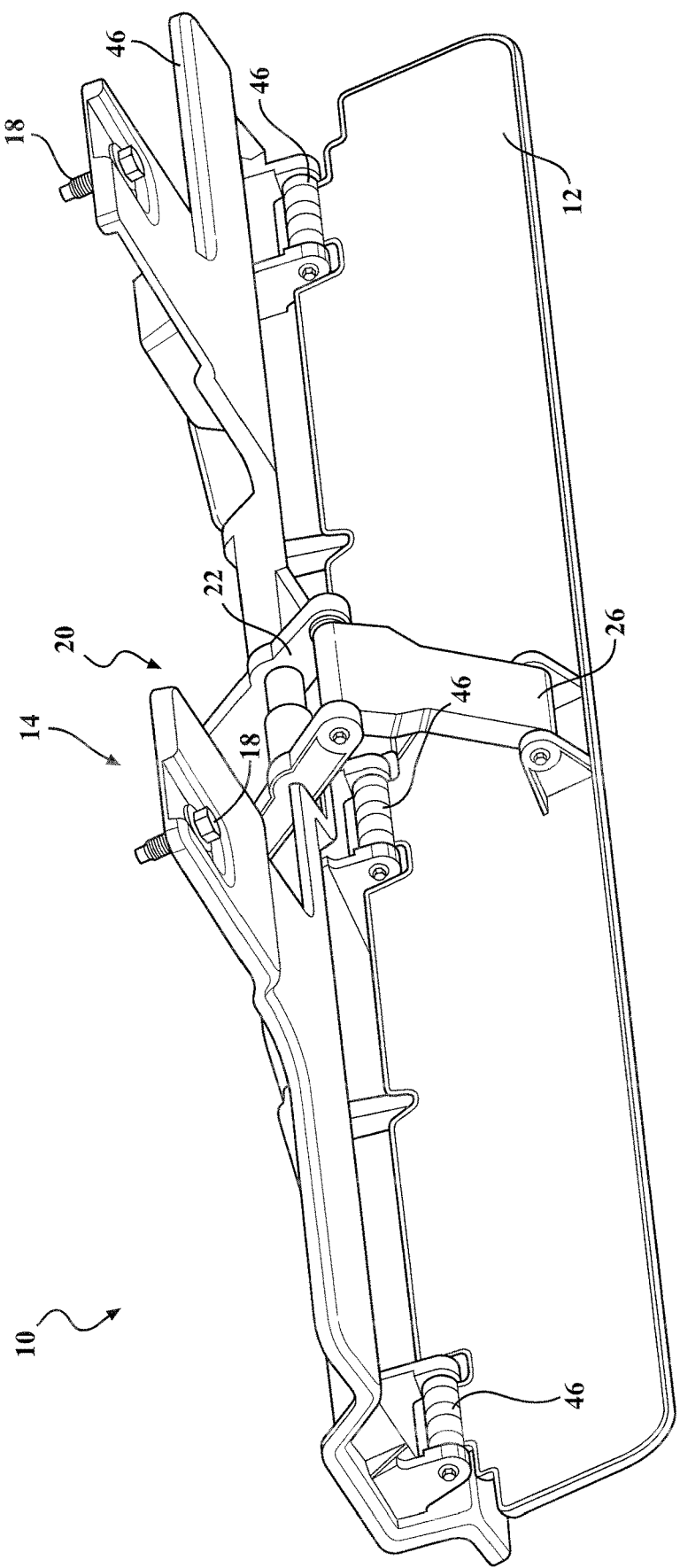
FIG. 1 is a rear top isometric view of the active front deflector assembly with the blade in the extended position.

The following description of the preferred embodiment is merely exemplary in nature and is in no way intended to limit the invention, its application, or uses.

Referring to FIGS. 1-8 generally, in accordance with the present invention, there is provided an active front deflector assembly generally shown at 10, movable between a retracted position (or "stowed" position) and a deployed position (or "extended" position) under predetermined conditions. The active front deflector assembly 10 provides a blade 12 that deploys and retracts based on vehicle requirements. This allows for a deployment lower than fixed panel systems to significantly reduce drag, reduce emissions, improve fuel economy, and improve active grille shutter performance when used in combination with the active front deflector assembly 10. Additionally, it allows for the system to retract so the vehicle can still meet ground clearances, ramp angles, off-road requirements, etc. In the event of impact while the system is deployed, an actuator 14 allows the system to retract and/or move freely to help prevent damage. These are significant improvements over typical vehicle systems utilizing a fixed sacrificial panel below and/or near the fascia to achieve basic and less effective aerodynamic improvements.

The active front deflector assembly 10 has a cross member 16 for attaching to an underbody of a vehicle. The cross member 16 also includes a plurality of slip joint connections 18 for connecting to the underbody of the vehicle. The active front deflector assembly 10 uses a four bar linkage to move the blade 12. The four bar linkage includes an actuator link assembly 20 that includes the cross member 16 which is a fixed link, the actuator 14, a drive link 22, a floating link 26 and the blade 12.

Connected to the cross member 16 is the actuator 14 that is part of the actuator link assembly 20. The actuator 14 is an electric motor, such as for example, but not limited to, a brushed or brushless DC motor having a set of gears that cause the rotation of a pass through drive connection 28. More generally the actuator 14 is a rotary actuator, e.g., with feedback options, hex-type, screw-type drive, high speed actuator, electric, mechanical, linear, e.g., with current override circuits, declutching, hydraulic, pneumatic, extending, power lift actuator, or any other actuator and combinations thereof depending on the application and predetermined vehicle needs. The actuator 14 is controlled by receiving signals from a vehicle network through a connector 32, which can send and receive signals with the vehicle network. The connector 32 also supplies power to energize the motor. The actuator 14 has at least one flange 34 extending from an actuator housing 30 for connecting to the cross member 16.

The actuator 14 includes a pass through drive connection 28 through the actuator housing 30. The pass through drive connection 28 has two connection openings on opposite sides of the actuator housing 30. Each of the two connection openings of the pass through drive connection 28 has a female shaped surface. The female shaped surface can be virtually any shape but includes, square, triangle, hexagonal, octagonal or any other suitable shape.

Figure 9:
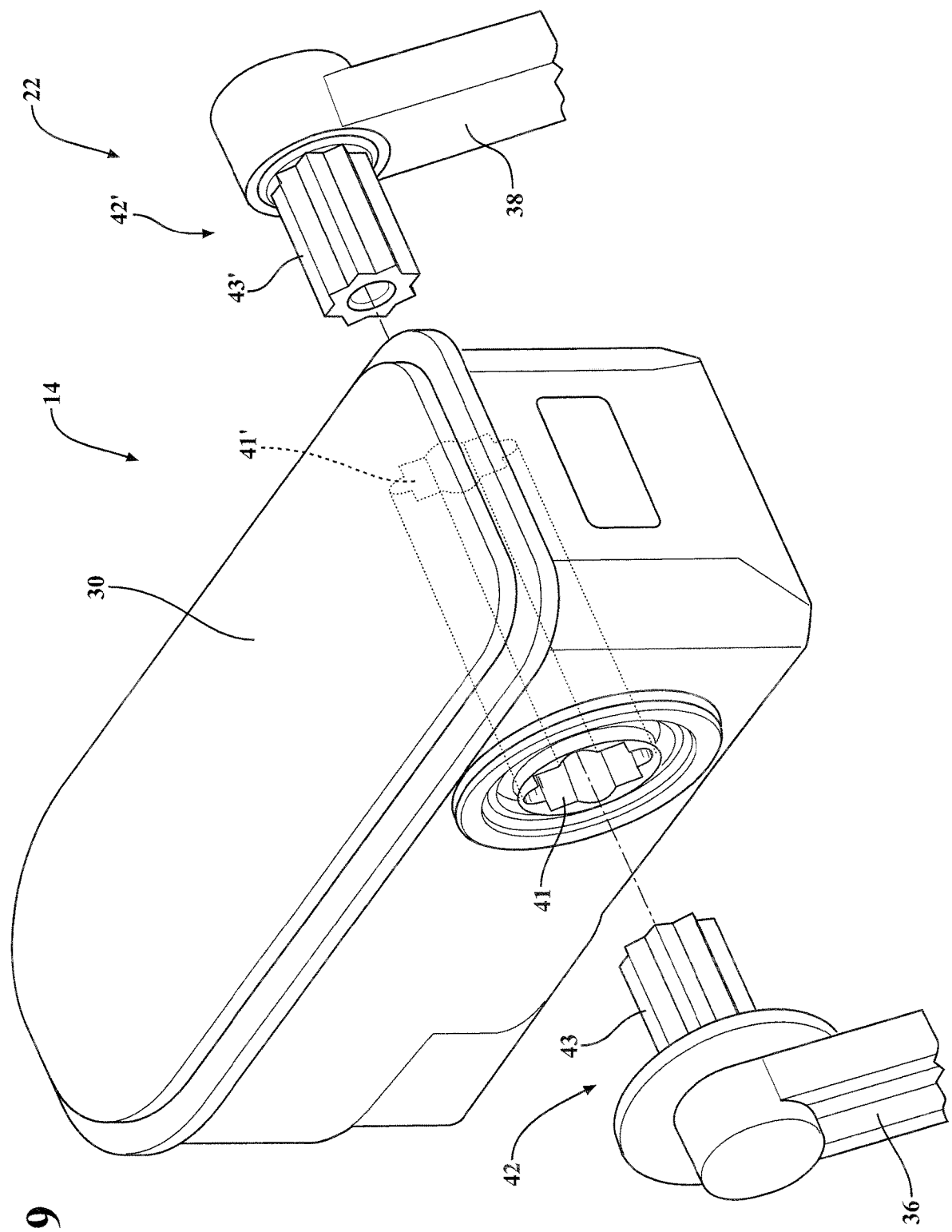
FIG. 9 is an enlarged exploded side view of the actuator and the drive link.

Referring to FIG. 9 in particular the details of a portion of the actuator link assembly 20 are shown. The actuator link assembly 20 includes the drive link 22 connected to the pass through drive connection 28 of the actuator 14. The drive link 22 is two pieces 36, 38 connected together with a at a bridge 40 for moving both of the two pieces 36, 38 of the drive link 22 together. Each of the two pieces 36, 38 of the drive link 22 include a drive connection end 42, 42' and a driven connection end 44, 44' (Shown in FIG. 2). The drive connection end 42, 42' connects with a respective one of the two connection openings of the pass through drive connection 28. Each drive connection end 42, 42' has a male shaped surface 43, 43' for providing a mating connection with the female shaped surface 41, 41' of the respective one of the two connection openings. The male shaped surface 43, 43' can be virtually any shape but includes, square, triangle, hexagonal, octagonal or any other suitable shape.

Figure 2:
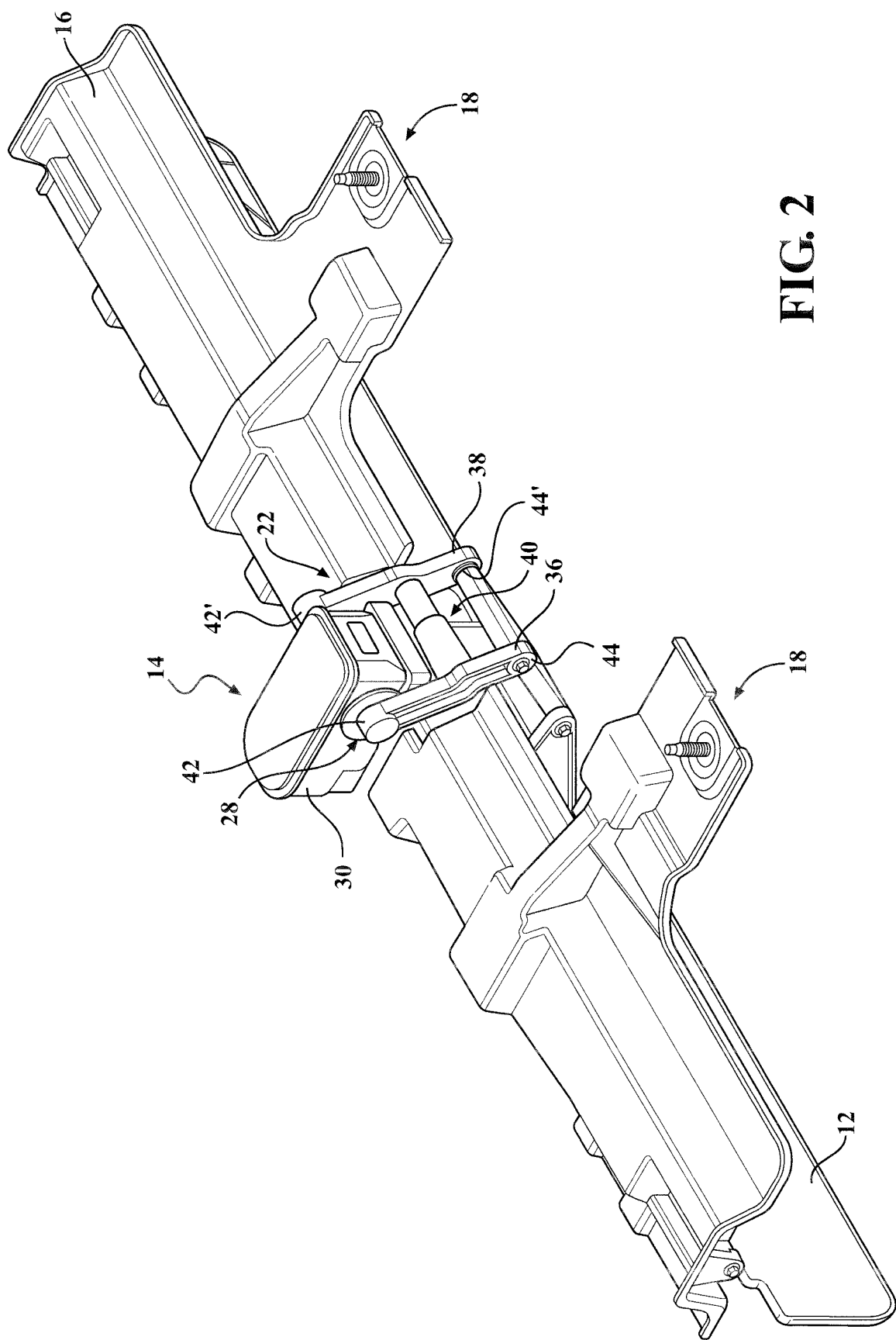
FIG. 2 is a rear top isometric view of the active front deflector assembly with the blade in the retracted position.
Figure 3:
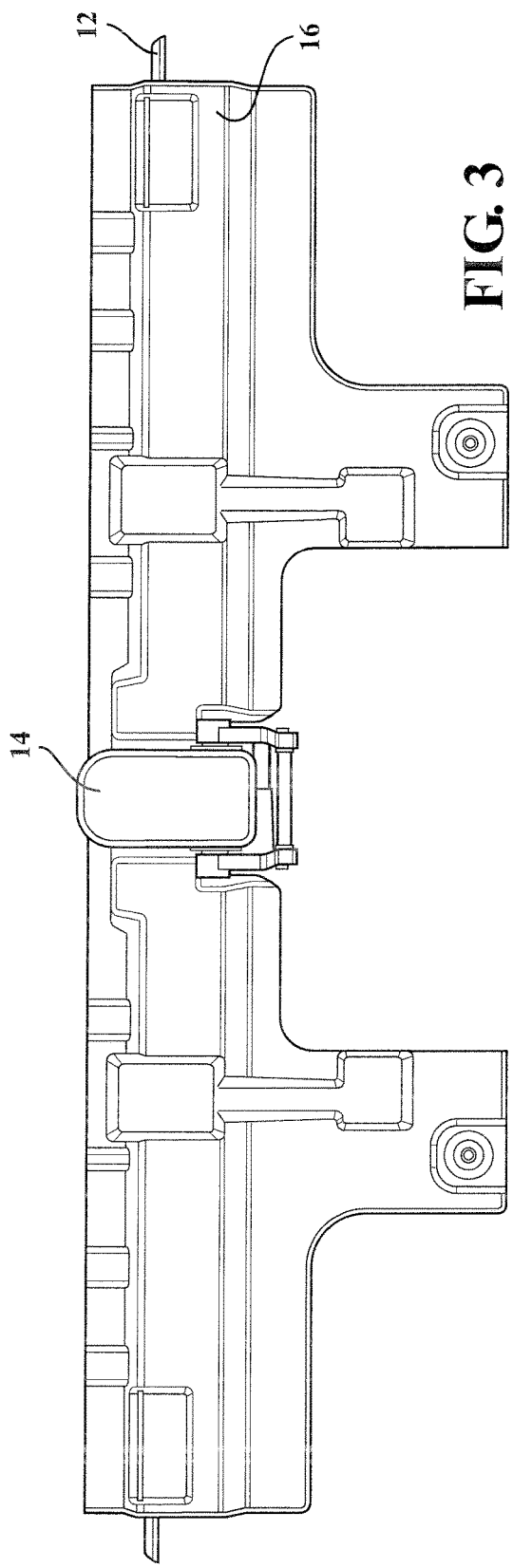
FIG. 3 is a top plan view of the active front deflector assembly with the blade in the extended position.
Figure 4:
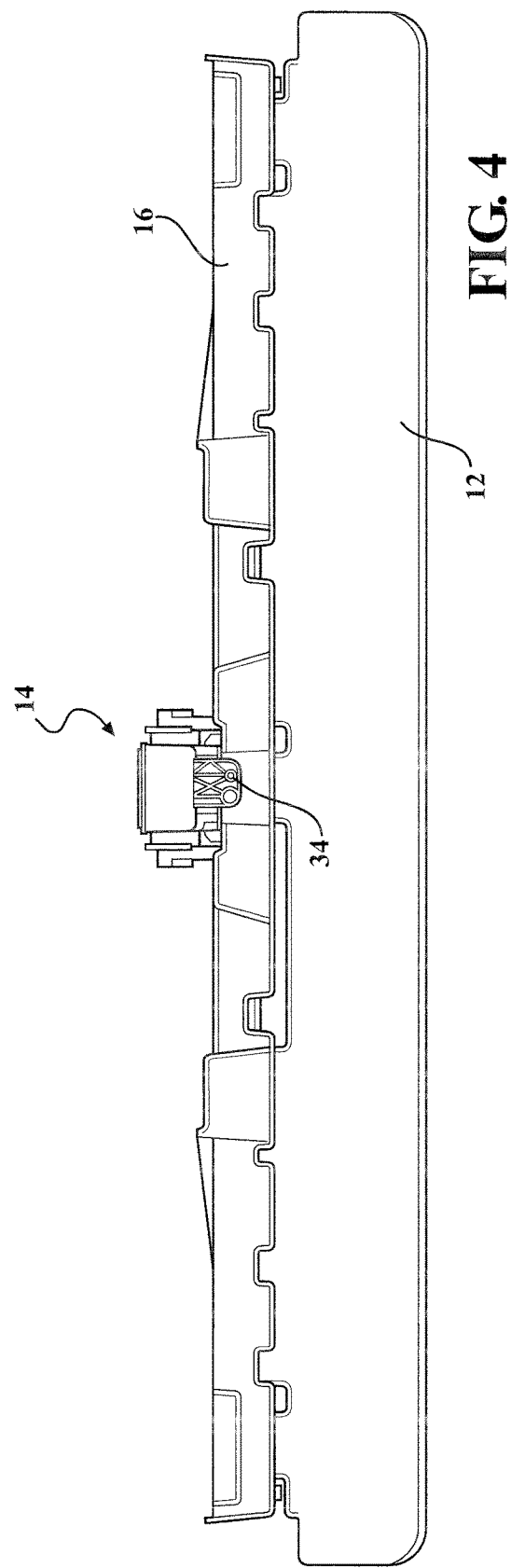
FIG. 4 is a front isometric view of the active front deflector assembly with the blade in the extended position.
Figure 5:
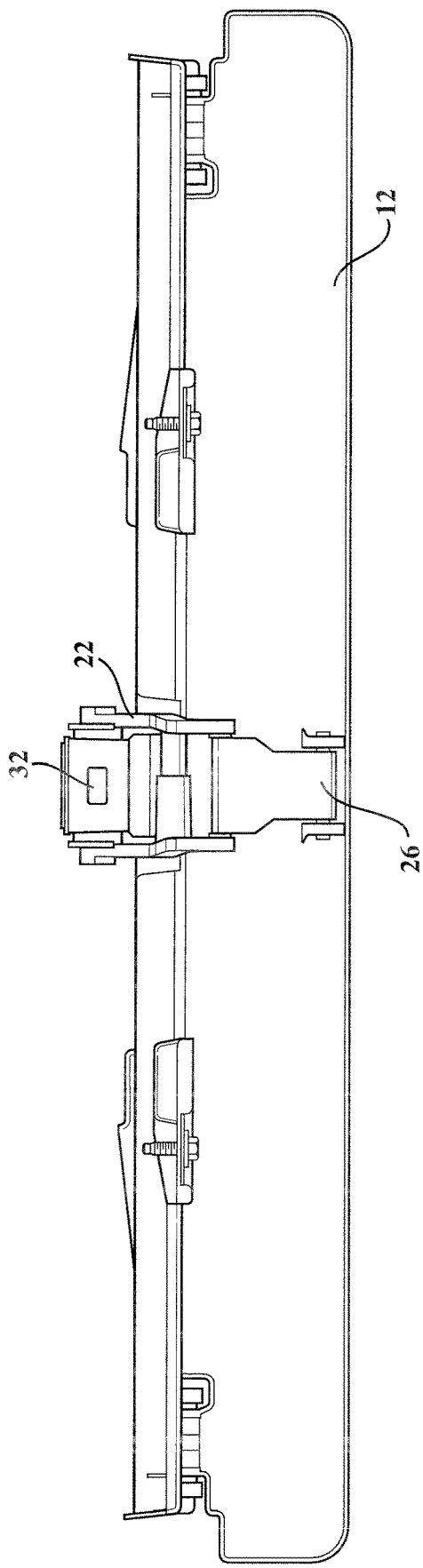
FIG. 5 is a rear isometric view of the active front deflector system with the blade in the extended position
Figure 6:
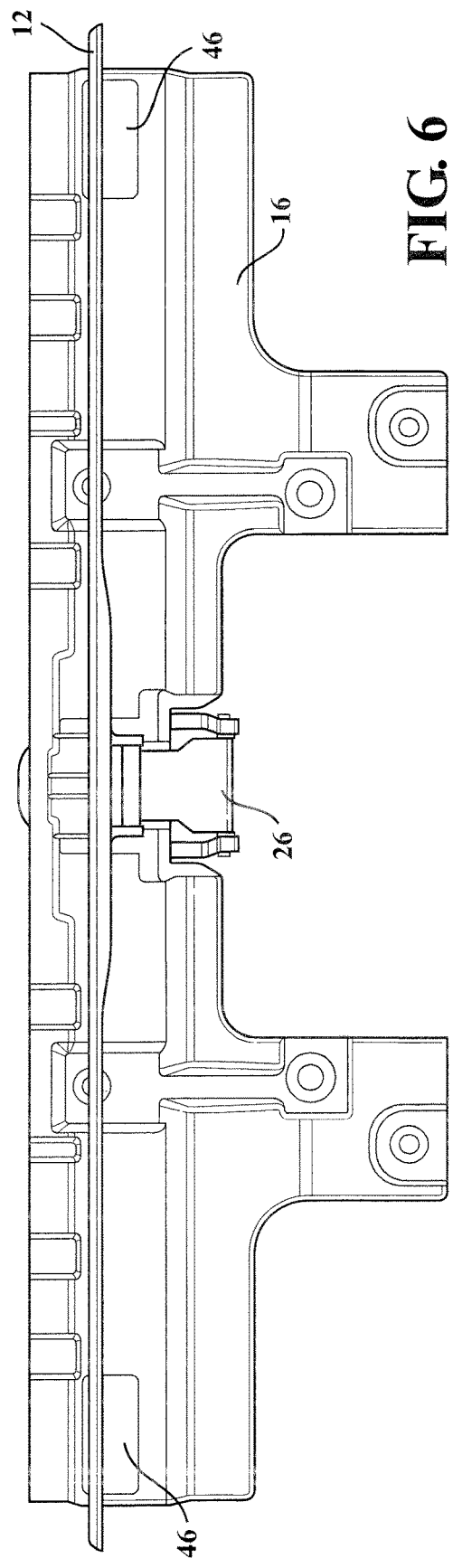
FIG. 6 is a bottom plan view of the active front deflector assembly with the blade in the extended position.

Referring to FIG. 2, connected to each driven connection end 44, 44' is the floating link 26. The floating link 26 is rotatably connected to each driven end 42, 42' of the two pieces 36, 38 of the drive link 22. The rotatable connection between the each drive end connection 44, 44' and the floating link 26 is accomplished using apertures formed on drive end connection 44, 44', which received pin extending from the surface of the floating link 26.

The blade 12 is made of a composite plastic in this particular embodiment. However, it is also within the scope of the invention to manufacture the blade 12 to be formed of different materials such as steel or aluminum (depending on the particular application), painted carbon fiber, extruded rubber, or other suitable impact resistant material to withstand a predetermined load without departing from the scope of the invention. Additionally, the blade is a single piece, e.g., of molded composite plastic, however, it is within the scope of this invention for the blade 12 to be made or multiple pieces assembled together.

When the blade 12 is in the fully deployed position it extends to about 90 degrees or perpendicular to the longitudinal axis 48 or plane of the cross member 16. It is also within the scope of this invention for the blade 12 to be positioned at any intermediate position between 0 and 90 degrees. Accordingly, the blade 12 extends generally vertically along the vehicle front to prevent air from ducking under and swirling under the vehicle where it is turbulent due to all of the components under the vehicle, and reduces drag. The blade 12 generally flat however it can be molded or shaped to follow the curvature of the front end of the vehicle and/or can be scooped or concaved or other suitable shape/profile to further direct air flow depending on the application. When the blade 12 is down in the deployed position it is extended generally about one quarter to one half of the distance to the traversed ground surface, preferably, about one third of the distance.

Figure 7:
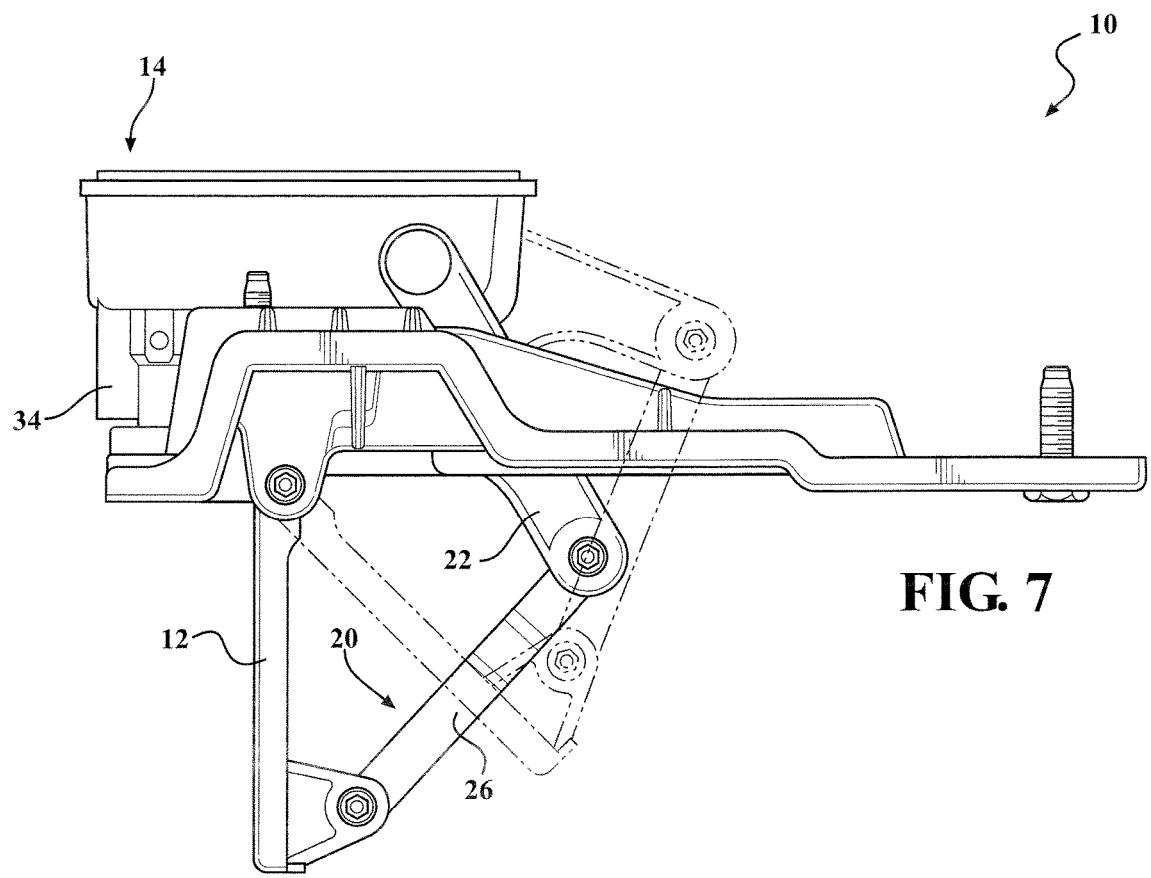
FIG. 7 side cross-sectional plan view of the active front deflector system with the blade in the extended position.

In operation the actuator 14, when energized to move the blade 12 from the retracted position to the deployed position, rotates the female member of the pass through drive 28 in a first direction, which rotates the drive link 22 downward causing the floating link 26 to push and pivot the blade 12 about the one or more pivot pins 46 to move the blade 12 downward relative to the cross member 16. As shown in FIG. 7 the blade 12 in the deployed position moves to a position that is about 90 degrees or perpendicular to a plane extending along the longitudinal axis of the cross member 16. Also shown in FIG. 7 the blade 12 can move to different angles when in the deployed position. For example the angle id defined as the position of the blade 12 relative to the longitudinal axis 48 or plane of the cross member 16 or fixed base link. It is also within the scope of this invention for the blade 12 to be positioned at any angle 0 and 90 degrees. In some embodiments of the invention the blade 12 is deployed to one angle selected in a range of 75 to 85 degrees.

Figure 8:
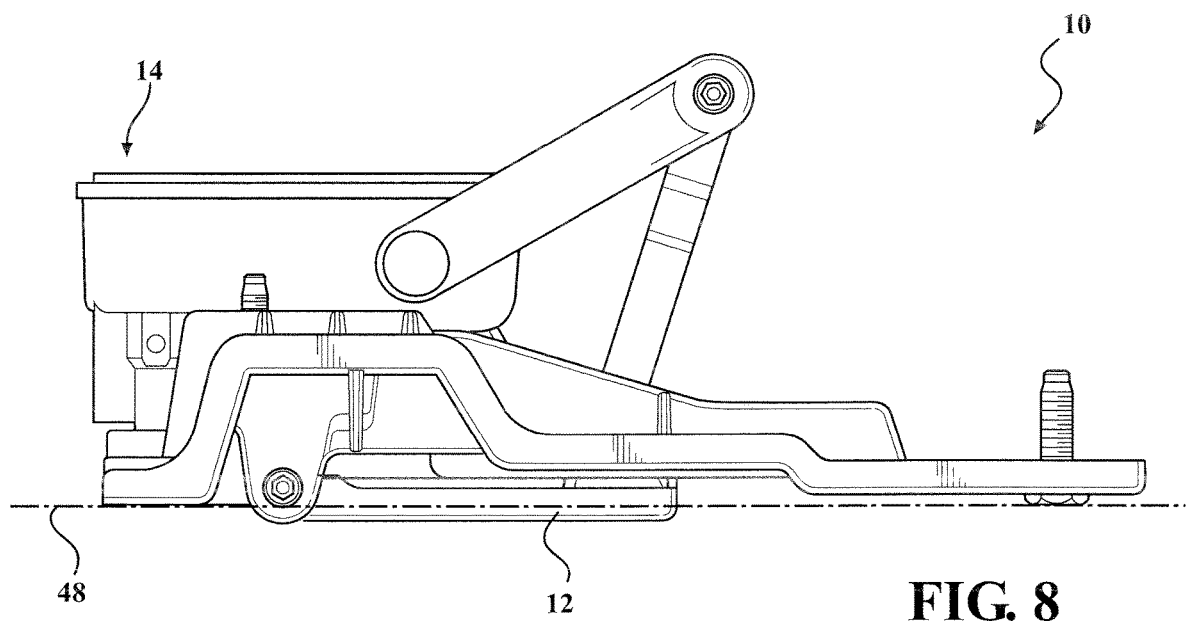
FIG. 8 side cross-sectional plan view of the active front deflector system with the blade in the retracted position.

FIG. 8 shows the blade 12 when moved to the retracted position that is parallel to a bottom longitudinal plane 48 of the cross member 16. Movement to the retracted position is accomplished when the actuator 14 rotates the pass through connection 28 in a second direction opposite the first direction, which rotates the drive link 22 upward relative to the cross member 16. The movement of the drive link 22 moves the floating link 26 upward, causing the blade 12 to rotate about the one or more pivot pins 46 to the position shown in FIG. 8.

The actuator 14 is clutched to prevent damage to the system, which is another significant advantage. In the event that an object strikes the blade 12 in the deployed position the system is designed to absorb the energy, but if the impact exceeds a predetermined set level it is released by the actuator's 14 internal clutch allowing it to move with the impact preventing damage to the system.

In a preferred embodiment, the actuator 14 has internal clutching that de-clutches or disengages gears allowing the blade 12 to rotate or move out of the way under a predetermined condition to help prevent damage to the active front deflector assembly 10. By way of example, upon impact of a predetermined force to the blade 12 the actuator 14 clutch will disengage the gearing so that the blade 12 can move freely out of the way.

The actuator 14 is sealed and has communication capability with the vehicle through the connector 32. The actuator 14 and the vehicle also communicate to deploy and retract the blade 12 based upon predetermined conditions such as vehicle speed, wind direction, yaw, etc., and combinations thereof. By way of non-limiting example, the blade 12 is retracted until the vehicle reaches a predetermined speed of 30 miles per hour, e.g., about 30-40 mph, then the blade 12 is extended and stays deployed until the vehicle drops back down to below the predetermined speed or other predetermined conditions where is it no longer practical to have the blade 12 in the deployed position.

Within the actuator 14 there are electronics that provide shut off capability. In one aspect there is a shut off printed circuit board (PCB) with connector contacts that correlate with vehicle communication networks for commanding a motor based upon predetermined conditions, e.g., commanding energizing of the motor correlating with predetermined vehicle speed ranges. The PCB electronics senses current spike for override, which allows the clutch to disengage the drive system allowing it to rotate freely.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An active front deflector assembly for a vehicle comprising:
   a cross member for attaching to an underbody of a vehicle, wherein the cross member is a fixed link of an actuator link assembly;
   the actuator link assembly includes an actuator, drive link, floating link and a blade;
   the actuator is connected to the cross member, the actuator includes a drive connection;
   wherein the drive link includes a drive connection end and driven connection end, where the drive connection end connects with the drive connection of the actuator;
   the floating link rotatably connected to the driven end of the of the drive link; and
   the blade is a follower link connected between the floating link and the cross member, wherein the blade is connected to the cross member with one or more pivots and the blade is pivotally connected to the floating link so that when the actuator is energized the blade pivots about the one or more pivots on the cross member, wherein the blade pivots about the one or more pivots between a retracted position and extended position, wherein the retracted position is when a plane of the blade is parallel to a longitudinal plane of the cross member and the extended position is when the plane of the blade is perpendicular to the longitudinal plane of the cross member.

2. The active front deflector assembly of claim 1, wherein the blade is a flat blade.

3. The active front deflector assembly of claim 1, wherein the predetermined condition for retracting the blade is vehicle speed in the range of less than 30 miles per hour and/or when the actuator senses higher than desired predetermined loads.

4. An active front deflector assembly for a vehicle comprising:
   a cross member for attaching to an underbody of a vehicle, wherein the cross member is a fixed link of an actuator link assembly;
   the actuator link assembly includes an actuator, drive link, floating link and a blade;
   the actuator is connected to the cross member and the actuator includes a pass through drive connection through the actuator housing where the pass through drive connection has two connection openings on opposite sides of the actuator housing, each of the two connection openings has a female shaped surface;
   the drive link connected to the pass through drive connection, wherein the drive link has two pieces connected together at a bridge for synchronous movement of both of the two pieces of the drive link together, wherein each of the two pieces of the drive link include a drive connection end and driven connection end, where the drive connection end connects with a respective one of the two connection openings of the pass through drive connection, wherein each drive link connection end has a male shaped surface for providing a mating connection with the female shaped surface of the respective one of the two connection openings;
   the floating link is rotatably connected to each driven end of the of the two pieces of the drive link; and
   the blade is a follower link connected between the floating link and the cross member, wherein the blade is connected to the cross member with one or more pivots and the blade is pivotally connected to the floating link so that when the actuator is energized the blade pivots about the one or more pivot on the cross member.

5. The active front deflector assembly of claim 4, wherein the blade pivots about the one or more pivots between a retracted position and extended position, wherein the retracted position is when a plane of the blade is parallel to a longitudinal plane of the cross member and the extended position is when the plane of the blade is perpendicular to the longitudinal plane of the cross member.

6. The active front deflector assembly of claim 5, wherein the blade is positionable at any position between the extended position and the retracted position.

7. The active front deflector assembly of claim 4, wherein the bridge includes a combination of a female extension configured to receive a male extension such that one of the two pieces has the female extension and the other of the two pieces has the male extension.

8. The active front deflector assembly of claim 4, wherein there is no more than one actuator link assembly that moves the blade.

9. The active front deflector assembly of claim 4, wherein the blade is a flat blade.

10. The active front deflector assembly of claim 4, wherein the actuator correlates with vehicle communication networks for commanding operation of the actuator based upon predetermined conditions.

11. The active front deflector assembly of claim 10, wherein the predetermined conditions are selected from the group consisting of vehicle speed, wind direction, yaw, and combinations thereof.

12. The active front deflector assembly of claim 11, wherein one of the predetermined conditions for deploying the blade is vehicle speed in the range of at least 30 miles per hour.

13. The active front deflector assembly of claim 11, wherein one of the predetermined conditions for retracting the blade is vehicle speed in the range of less than 30 miles per hour and when the actuator senses higher than desired predetermined loads.

14. The active front deflector assembly of claim 5, wherein when in a deployed position the blade is at an angle between the fixed base link and drive link and the angle is the position of the blade relative to the fixed base link, wherein the angle in the deployed position is one angle selected in a range of 75 to 85 degrees.

15. The active front deflector assembly of claim 4, wherein the actuator has object detection and declutches upon impact at a predetermined force the blade to rotate freely out of the way to prevent damage, wherein this motion is achieved with the geometry of the linkage systems and the ratio of the links to each other.

16. An active front deflector assembly for a vehicle comprising:
- a cross member for attaching to an underbody of a vehicle, wherein the cross member is a fixed link of an actuator link assembly;
- a plurality of slip joint connections on the cross member for connecting to the underbody of the vehicle;
- the actuator link assembly includes an actuator, drive link, floating link and a blade;
- the actuator is connected to the cross member, wherein the actuator has a drive connection;
- the drive link connected to the drive connection, wherein the drive link is two pieces connected together with at a bridge for moving both of the two pieces of the drive link together, wherein each of the two pieces of the drive link include a drive connection end and driven connection end, where the drive connection end connects with the drive connection of the actuator;
- the floating link rotatably connected to each driven end of the of the two pieces of the driver; and
- the blade that is also a follower link connected between the floating link and the cross member, wherein the blade is connected to the cross member with one or more pivots and the blade is pivotally connected to the floating link so that when the actuator is energized the blade pivots about the one or more pivot on the cross member.

17. The active front deflector assembly of claim 16, wherein the blade pivots about the one or more pivot between a retracted position and extended position, wherein the retracted position is when a plane of the blade is parallel to a longitudinal plane of the cross member and the extended position is when the plane of the blade is perpendicular to the longitudinal plane of the cross member.

18. The active front deflector assembly of claim 16, wherein the blade is a flat blade.

19. The active front deflector assembly of claim 16, wherein the actuator senses current spike upon impact at a predetermined force causing circuit override for declutching so that the blade moves freely out of the way to prevent damage.

20. The active front deflector assembly of claim 16, wherein the actuator has object detection and declutches upon impact at a predetermined force the blade to rotate freely out of the way to prevent damage, wherein this motion is achieved with the geometry of the linkage systems and the ratio of the links to each other.

* * * * *